(12) United States Patent
Wang

(10) Patent No.: US 11,839,321 B2
(45) Date of Patent: Dec. 12, 2023

(54) FIXING STRUCTURE FOR FLOWER COMBINATION

(71) Applicant: CHU HSING METAL CO., LTD., Changhua County (TW)

(72) Inventor: Kuan-Chuan Wang, Changhua County (TW)

(73) Assignee: CHU HSING METAL CO., LTD., Changhua County (TW)

(*) Notice: Subject to any disclaimer, the term of this patent is extended or adjusted under 35 U.S.C. 154(b) by 0 days.

(21) Appl. No.: 17/571,439

(22) Filed: Jan. 7, 2022

(65) Prior Publication Data

US 2023/0218096 A1    Jul. 13, 2023

(51) Int. Cl.
    *A47G 7/04*    (2006.01)
(52) U.S. Cl.
    CPC .................... *A47G 7/041* (2013.01)
(58) Field of Classification Search
    CPC ..................................................... A47G 7/041
    See application file for complete search history.

(56) References Cited

U.S. PATENT DOCUMENTS

| | | | | |
|---|---|---|---|---|
| 1,541,799 A * | 6/1925 | Dodge | ................... | A47J 27/10 220/23.88 |
| 2,550,355 A * | 4/1951 | Brown | ................... | A47G 7/041 211/74 |
| 3,470,651 A * | 10/1969 | Gerhard | ................ | A01G 9/124 47/45 |
| 5,094,060 A * | 3/1992 | Caird | ..................... | A47G 7/041 220/23.88 |
| 5,673,511 A * | 10/1997 | Holtkamp, Jr. | ........ | A47F 7/0078 47/87 |
| 7,069,691 B2 * | 7/2006 | Brooke | ................... | A01G 31/02 47/59 R |
| 2008/0141587 A1 * | 6/2008 | Guthrie | ................. | A01G 9/028 47/86 |

(Continued)

FOREIGN PATENT DOCUMENTS

| | | | | |
|---|---|---|---|---|
| GB | 2473645 A | * | 3/2011 | ............ A01G 9/045 |
| TW | I777879 B | * | 12/2021 | ............ A01G 9/045 |

OTHER PUBLICATIONS

Translation of KR-20100107536-A (Year: 2009).*

*Primary Examiner* — Monica L Perry
*Assistant Examiner* — Brittany A Lowery
(74) *Attorney, Agent, or Firm* — Chun-Ming Shih; LANWAY IPR SERVICES

(57) ABSTRACT

A fixing structure for a flower combination includes a container accommodated in a top of a flower vase. The container includes multiple stop tabs configured to contact with the container in the opening of the top of the flower pot, multiple spaced partitions formed in the container and having different shapes and sizes, and multiple accommodation grooves defined beside the multiple spaced partitions and having different depths, thus fixing multiple potted plants in different heights. A respective one accommodation groove has multiple cylindrical columns extending from a bottom thereof, and a respective one cylindrical column includes an orifice which has a flat section formed on a distal end of the orifice, such that a respective one of multiple positioning stems is received in the orifice of the respective one cylindrical column of the respective one accommodation groove of the container securely.

3 Claims, 8 Drawing Sheets

(56) References Cited

U.S. PATENT DOCUMENTS

| | | | |
|---|---|---|---|
| 2008/0276530 A1* | 11/2008 | Trabka | A01G 9/028 47/65.5 |
| 2016/0075474 A1* | 3/2016 | Kinaya | A47G 19/30 206/507 |
| 2016/0135386 A1* | 5/2016 | Merz | A01G 9/12 47/70 |
| 2016/0360710 A1* | 12/2016 | Merzweiler | A01G 9/045 |
| 2020/0305356 A1* | 10/2020 | Hansord | A01G 27/06 |
| 2021/0219500 A1* | 7/2021 | Meng | A01G 9/028 |
| 2022/0124986 A1* | 4/2022 | Wang | A47G 7/02 |

* cited by examiner

FIXING STRUCTURE FOR FLOWER COMBINATION

FIELD OF THE INVENTION

The present invention relates to a fixing structure for a flower combination by which the container is accommodated in the opening of the flower vase to selectively receive multiple potted plants (such as the multiple orchid pots) in the multiple accommodation grooves of the container, and the multiple positioning stems are configured to fix the stalks of the multiple potted plants, thus connecting the multiple potted plants to form the flower combination quickly.

BACKGROUND OF THE INVENTION

Flower combinations are often used to decorate various meeting places, such as weddings, funerals, new home completion, company openings, etc. The most popular flower combinations are a variety of orchids which are bed planted, and are arranged in the flower combination based on using requirements with different flowers.

When forming the flower combination, a suitable flower pot or vase of large size is selected, but it is impossible to accommodate the orchids in the plate pot directly. To overcome such a problem, stuffing (such as Styrofoam or other materials) is filled into the plant pot at a specific height so as to accommodate the orchids, thus filling the stuffing troublesomely. Furthermore, the orchids cannot be fixed in the plant pot securely.

Accordingly, it is required to spend high labor cost and material cost when accommodating the orchids to the plant pot so as form the flower combination.

The present invention has arisen to mitigate and/or obviate the afore-described disadvantages.

SUMMARY OF THE INVENTION

The primary aspect of the present invention is to provide a fixing structure by which the multiple accommodation zones of the container are configured to receive the multiple potted plants so as to form flower combination quickly, and the multiple position stems are configured to fix the stalks of the multiple potted plants, and the multiple fixing sheets match with the multiple binding strips to bind the multiple potted plants stably to avoid a waste of stuffing, such as Styrofoam, clothes, or other materials.

Further aspect of the present invention is to provide a fixing structure by which the multiple accommodation grooves of the container are configured to receive the multiple potted plants (such as the multiple orchid pots), thus forming the flower combination quickly.

DETAILED DESCRIPTION OF THE PREFERRED EMBODIMENTS

Figure 1:
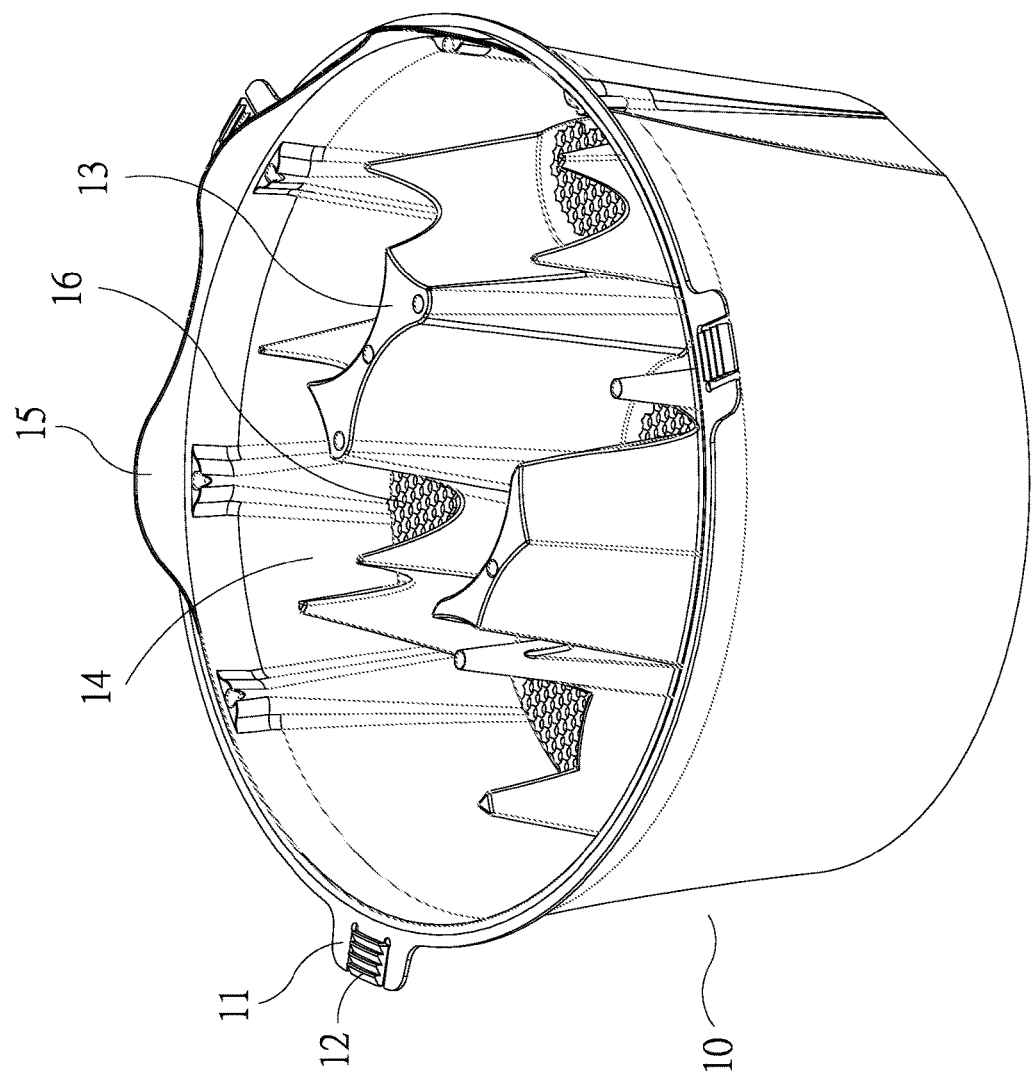
FIG. 1 is a perspective view showing the assembly of a fixing structure of a flower combination according to a preferred embodiment of the present invention.
Figure 2:
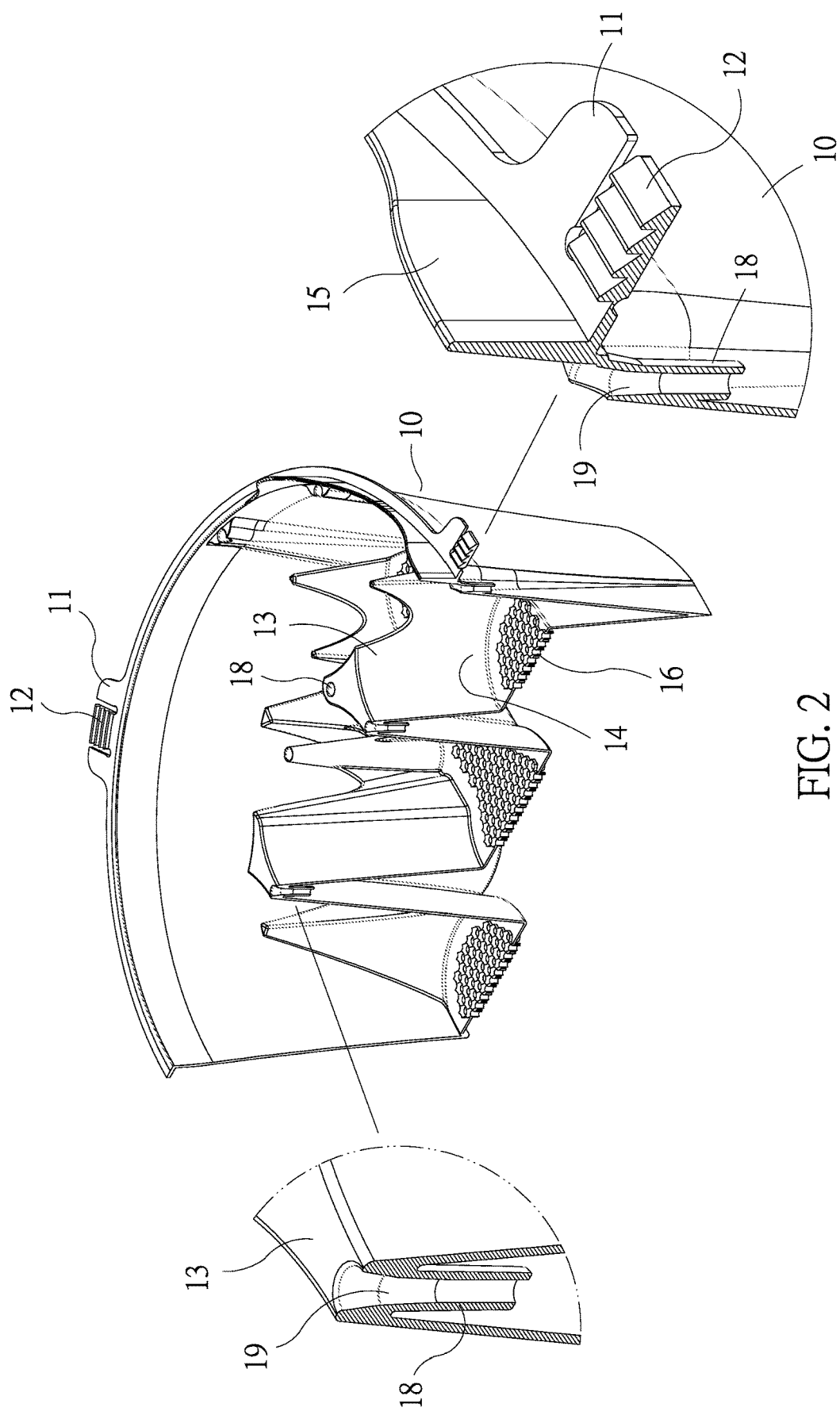
FIG. 2 is a cross-sectional perspective view showing the assembly of a part of the fixing structure for the flower combination according to the preferred embodiment of the present invention.
Figure 3:
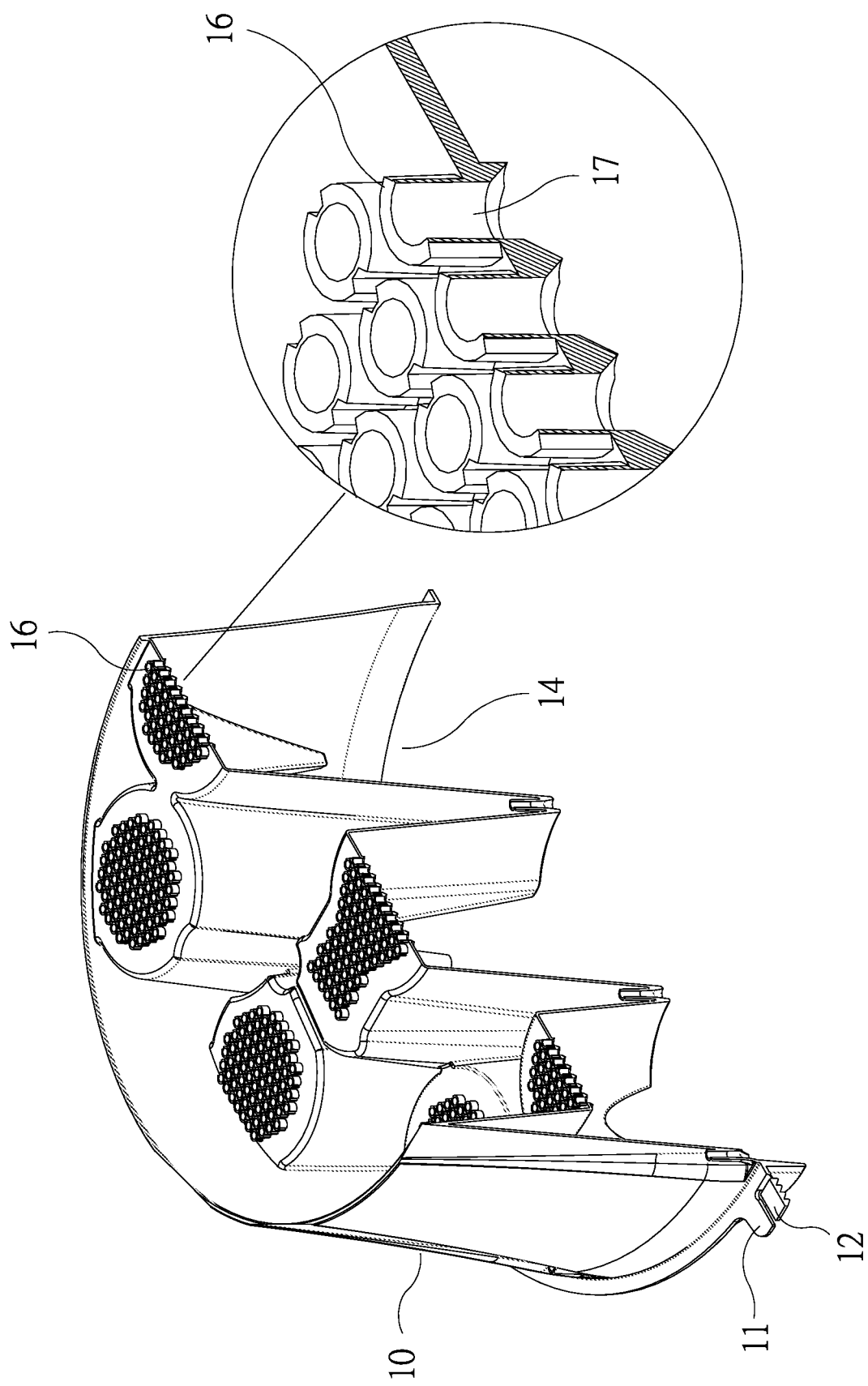
FIG. 3 is another cross-sectional perspective view showing the assembly of a part of the fixing structure for the flower combination according to the preferred embodiment of the present invention.
Figure 4:
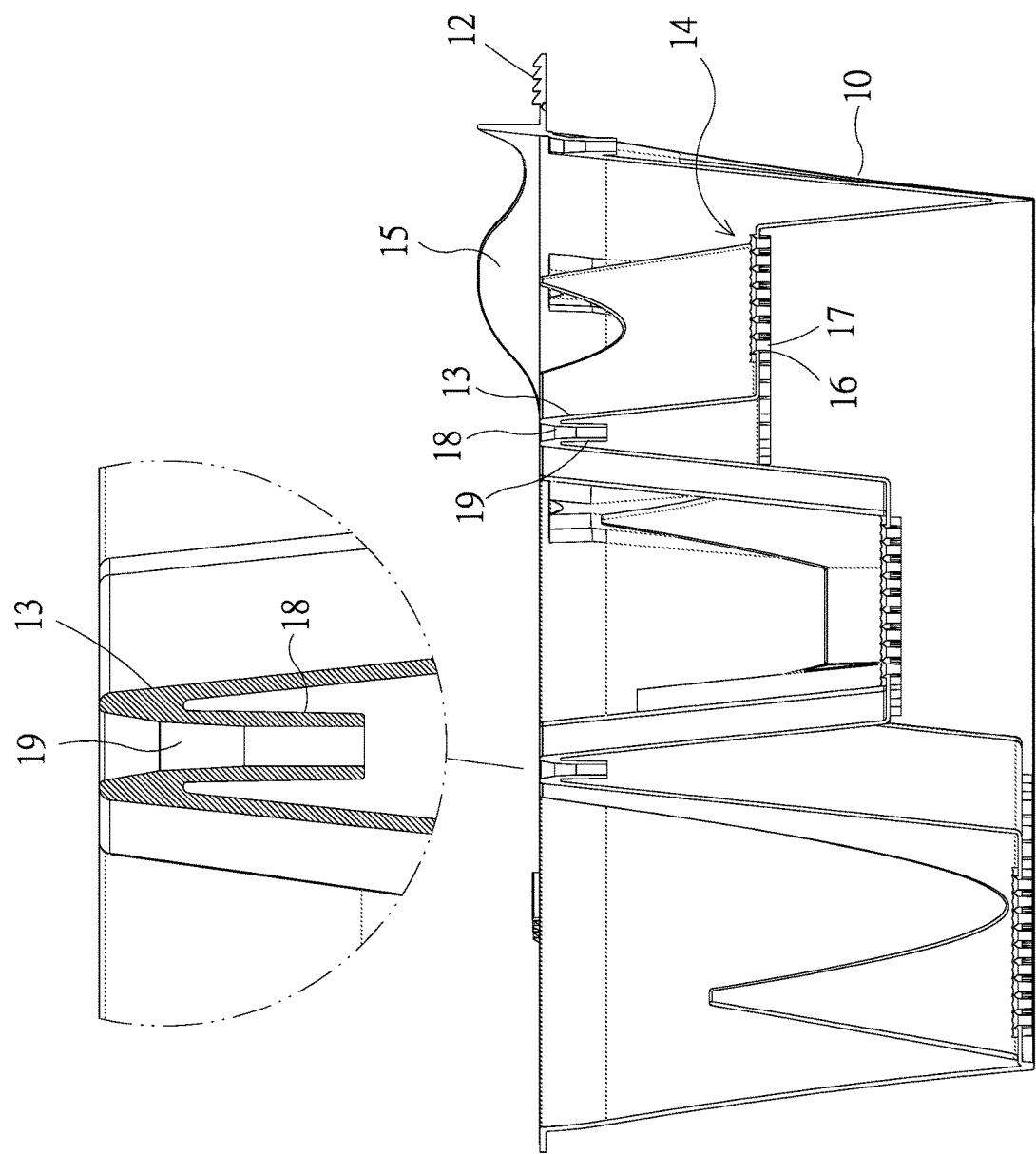
FIG. 4 is a cross sectional view showing the assembly of the fixing structure of the flower combination according to the preferred embodiment of the present invention.
Figure 5:
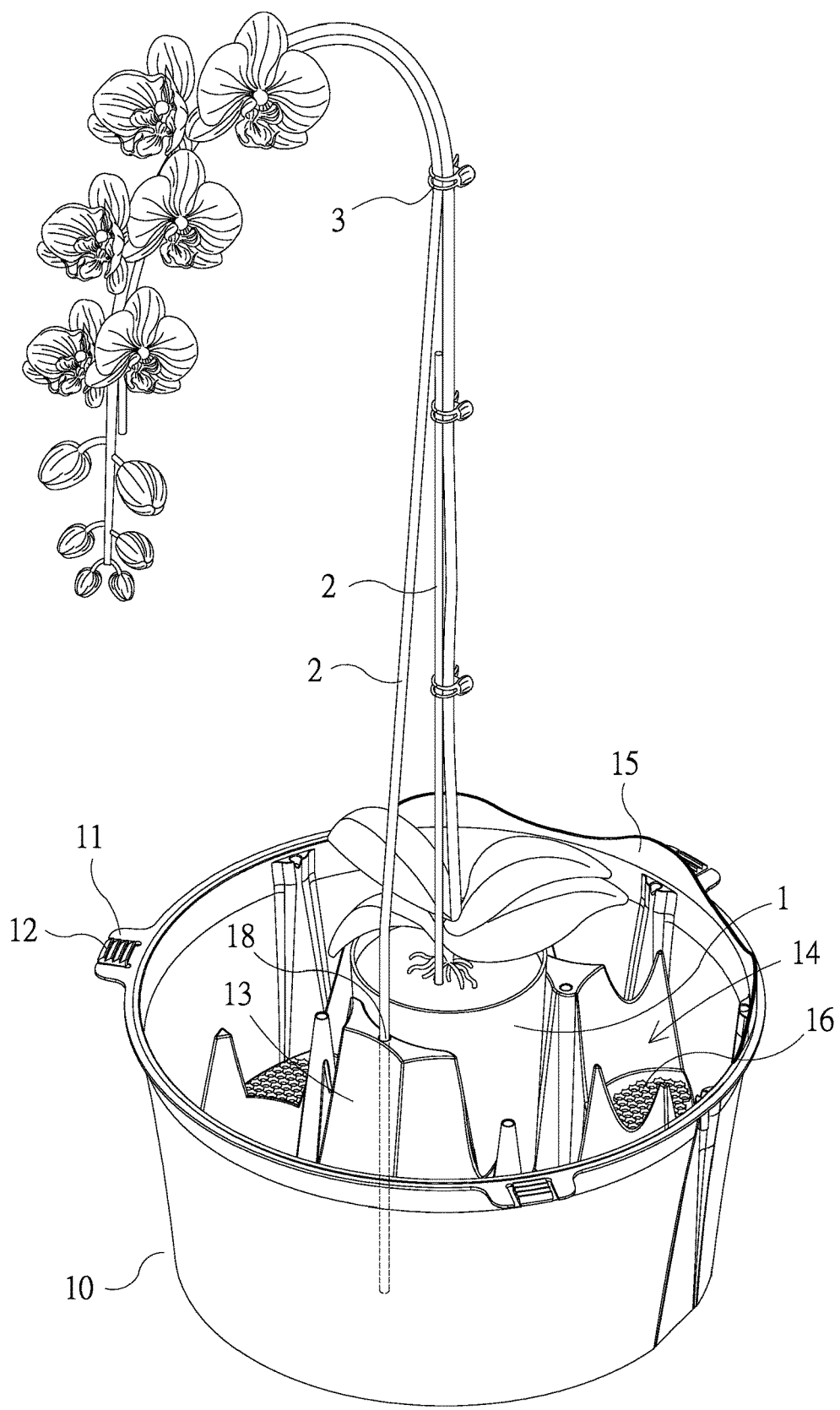
FIG. 5 is a perspective view showing the application of the fixing structure of the flower combination according to the preferred embodiment of the present invention.
Figure 6:
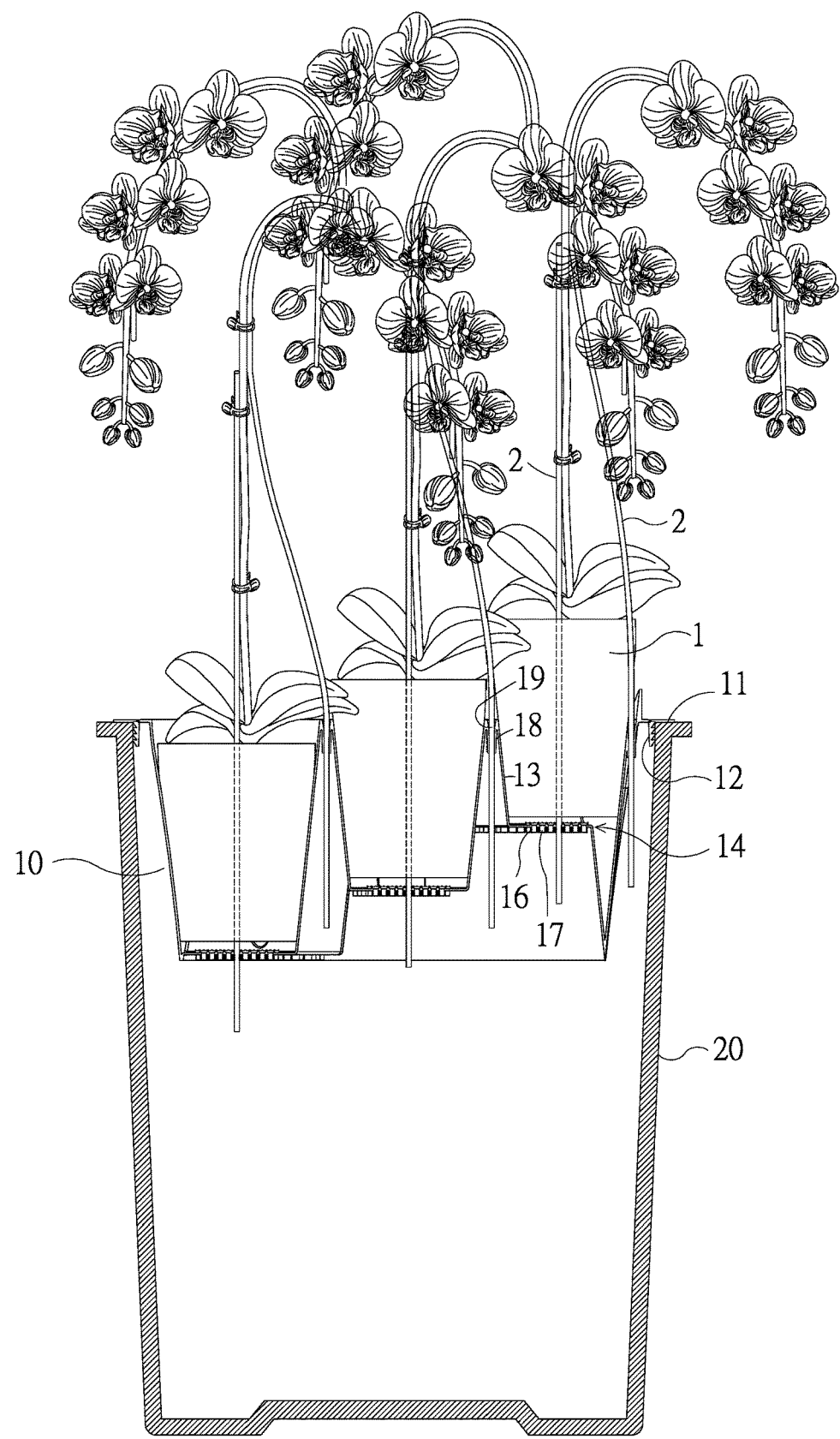
FIG. 6 is a cross sectional view showing the application of the fixing structure of the flower combination according to the preferred embodiment of the present invention.
Figure 8:
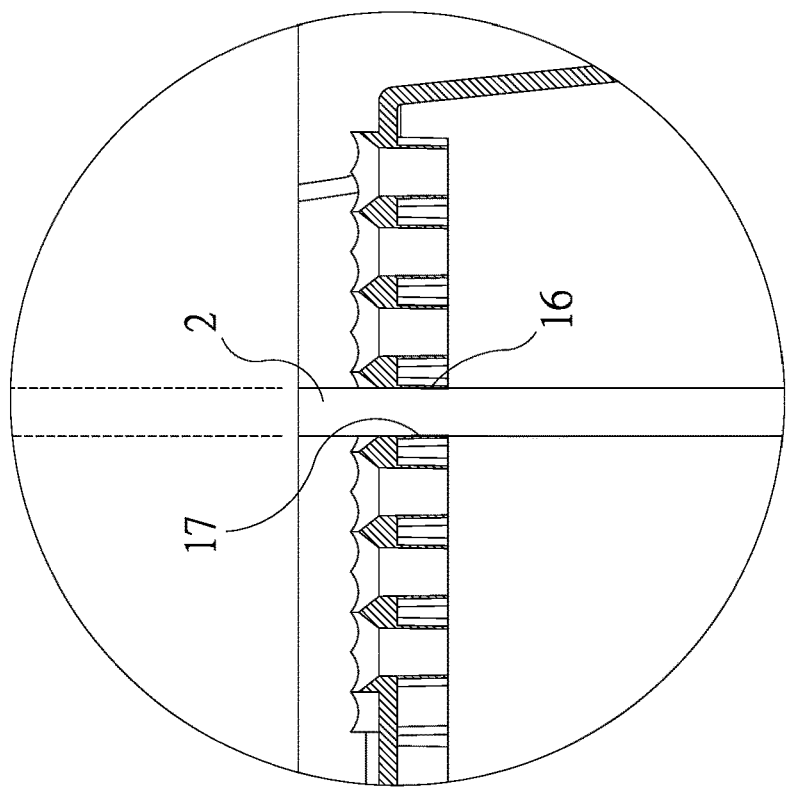
FIG. 8 is another cross sectional view showing the operation of a part of the fixing structure of the flower combination according to the preferred embodiment of the present invention.
Figure 7:
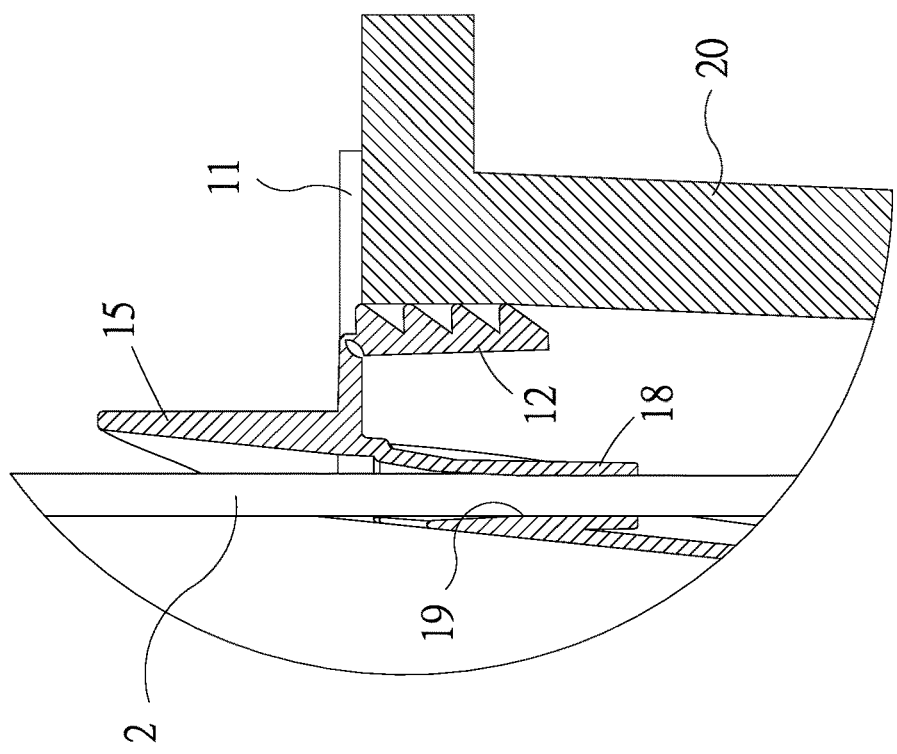
FIG. 7 is a cross sectional view showing the operation of a part of the fixing structure of the flower combination according to the preferred embodiment of the present invention.
Figure 9:
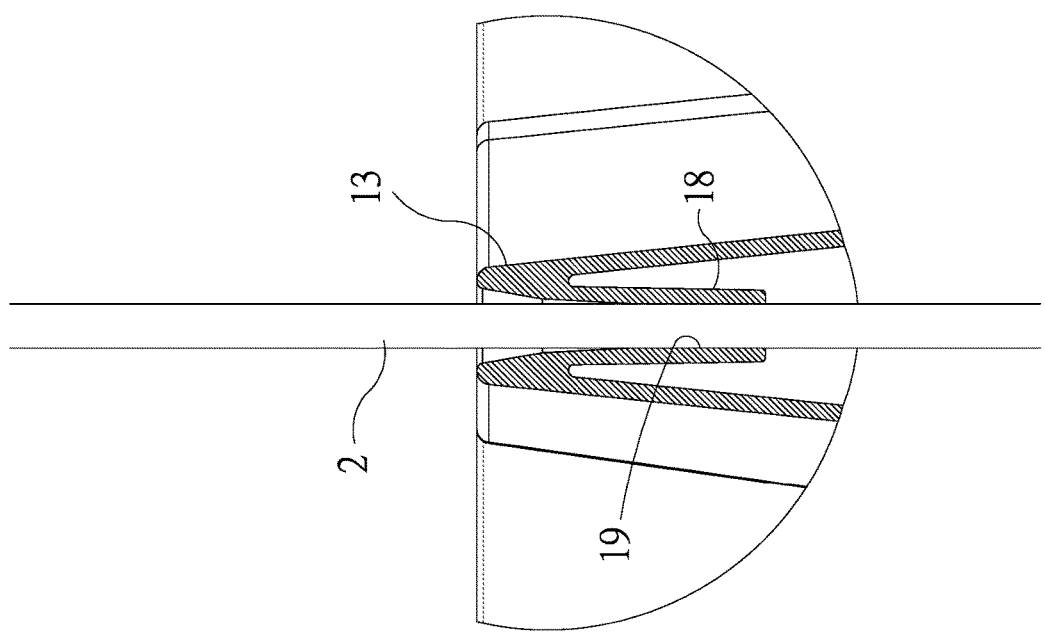
FIG. 9 is a cross sectional view showing the application of a part of the fixing structure of the flower combination according to the preferred embodiment of the present invention.

With reference to FIGS. 1-9, a fixing structure for a flower combination according to a preferred embodiment of the present invention comprises: a container 10 accommodated in a top of a flower vase 20 or a flower pot (not shown), wherein a diameter of the container 10 is less than a diameter of an opening of the top of the flower vase 20 so that the container 10 is accommodated in the opening of the flower vase 20, and the container 10 includes multiple stop tabs 11 separately extending from an outer wall thereof and configured to contact the container 10 in the opening of the top of the flower pot, the container 10 further includes multiple teeth 12 extending from a respective one stop tab 11 and configured to abut against an inner wall of the flower vase 20, such that the container 10 is connected with the opening of the top of the flower vase 20. The container 10 further includes multiple spaced partitions 13 formed therein and having different shapes and sizes, multiple accommodation grooves 14 defined beside the multiple spaced partitions 13 and having different depths, wherein some accommodation grooves 14 of shallow depths include multiple fixing sheets 15 extending from peripheral sides thereof and configured to fix multiple potted plants 1 stably, hence the multiple potted plants 1 are fixed in different heights to enhance visual effects. Furthermore, a respective one accommodation groove 14 further has multiple cylindrical columns 16 extending from a bottom thereof, and a respective one cylindrical column 16 has an orifice 17, wherein the orifice 17 has a flat section formed on a distal end thereof, a respective one of some spaced partitions 13 has a hollow post 18 extending downward, and the hollow post 18 has a conical receiving hole 19 so as to receive a positioning stem 2 for fixing a stalk of a respective one potted plant 1, thus selectively fixing the stalk of the respective one potted plant 1 in the conical receiving hole 19 of the hollow post 18 or the orifice 17 of the respective one cylindrical column 16 and obtaining aesthetic appearance.

In use, the container 10 is accommodated in the opening of the flower vase 20 to receive multiple potted plants 1 (such as multiple orchid pots) in the multiple accommodation grooves 14 of the container 10, wherein the respective one positioning stem 2 is received in the orifice 17 of the respective one cylindrical column 16 of the respective one accommodation groove 14 of the container securely. When connecting the multiple potted plants 1 to form a flower combination in a desired shape, the positioning stem 2 is selectively received in the receiving hole 19 of the hollow post 18 of the respective spaced partition 13, and a flower of the respective potted plant is pulled to contact the positioning stem 2 and is clamped by a clamper 3, thus forming the flower combination in the desired shape easily and quickly. Furthermore, the respective one cylindrical column 16 of the respective one accommodation groove 14 and the hollow post 18 of the respective spaced partition 13 accommodate the positioning stem 2 securely.

Accordingly, the multiple accommodation grooves of the container are configured to receive the multiple potted plants (such as the multiple orchid pots), thus forming the flower combination quickly. Preferably, the respective one cylindrical column 16 of the respective one accommodation groove 14 and the hollow post 18 of the respective spaced partition 13 accommodate the positioning stem 2 securely, thus fixing the respective one potted plant securely to avoid a waste of stuffing, such as Styrofoam, clothes, or other materials. In addition, the container is reusable to achieve environmental protection.

Thereby, the container is accommodated in the opening of the flower vase to selectively receive multiple potted plants (such as the multiple orchid pots) in the multiple accommodation grooves of the container, and the multiple positioning stems are configured to fix the stalks of the multiple potted plants, thus connecting the multiple potted plants to form the flower combination quickly.

While the preferred embodiments of the invention have been set forth for the purpose of disclosure, modifications of the disclosed embodiments of the invention as well as other embodiments thereof may occur to those skilled in the art. Accordingly, the appended claims are intended to cover all embodiments which do not depart from the spirit and scope of the invention.

What is claimed is:

1. A fixing structure for a flower combination comprising: a container configured to accommodate in a top of a flower vase, a diameter of the container being less than a diameter of an opening of the top of the flower vase so that the container is configured to accommodate in the opening of the flower vase, and the container including multiple stop tabs separately extending from an outer wall thereof and configured to contact the container in the opening of the top of the flower pot, the container further including multiple spaced partitions formed therein and having different shapes and sizes, and multiple accommodation grooves defined beside the multiple spaced partitions and having different depths, thus fixing multiple potted plants in different heights to enhance visual effects;

wherein a respective one accommodation groove further has multiple cylindrical columns extending from a bottom thereof, and a respective one cylindrical column has an orifice, wherein the orifice has a flat section formed on a distal end thereof, such that a respective one of multiple positioning stems is received in the orifice of the respective one cylindrical column of the respective one accommodation groove of the container securely;

wherein some accommodation grooves of shallow depths include multiple fixing sheets extending from peripheral sides thereof and configured to fix multiple potted plants stably.

2. The fixing structure as claimed in claim 1, wherein a respective one of some spaced partitions has a hollow post extending downward, and the hollow post has a conical receiving hole so as to receive a positioning stem for fixing a stalk of a respective one potted plant selectively.

3. The fixing structure as claimed in claim 1, wherein the container further includes multiple teeth extending from a respective one stop tab and configured to abut against an inner wall of the flower vase, such that the container is connected with the opening of the top of the flower vase.

* * * * *